(12) United States Patent
Dove

(10) Patent No.: US 7,185,903 B2
(45) Date of Patent: Mar. 6, 2007

(54) LINEAR SUSPENSION SPRING

(76) Inventor: Jason L. Dove, P.O. Box 948, Huntersville, NC (US) 28078

( * ) Notice: Subject to any disclaimer, the term of this patent is extended or adjusted under 35 U.S.C. 154(b) by 420 days.

(21) Appl. No.: 10/847,717

(22) Filed: May 18, 2004

(65) Prior Publication Data

US 2005/0258614 A1 Nov. 24, 2005

(51) Int. Cl.
B60G 3/00 (2006.01)
(52) U.S. Cl. .................... 280/124.141; 280/124.151
(58) Field of Classification Search ......... 280/124.141, 280/124.145–124.147, 124.151, 124.154, 280/124.155
See application file for complete search history.

(56) References Cited

U.S. PATENT DOCUMENTS

| | | | | |
|---|---|---|---|---|
| 2,152,938 | A | * | 4/1939 | Welch .................. 280/124.103 |
| 2,793,874 | A | * | 5/1957 | Helm et al. ............ 280/124.151 |
| 3,375,020 | A | * | 3/1968 | Worsham .................. 280/89.11 |
| 3,589,700 | A | * | 6/1971 | Ruet et al. ................ 280/5.515 |
| 4,400,008 | A | | 8/1983 | Rumpel |
| 4,556,235 | A | | 12/1985 | Giebel |
| 4,903,985 | A | | 2/1990 | Muhr et al. |
| 5,044,614 | A | | 9/1991 | Rau |
| 5,240,278 | A | * | 8/1993 | Nelms .................. 280/124.141 |
| 5,364,114 | A | * | 11/1994 | Petersen .............. 280/124.151 |
| 5,421,565 | A | * | 6/1995 | Harkrader et al. .......... 267/220 |
| 5,954,318 | A | | 9/1999 | Kluhsman |
| 6,105,984 | A | * | 8/2000 | Schmitz et al. ........ 280/124.136 |
| 6,328,290 | B1 | | 12/2001 | Imaizumi et al. |
| 6,481,701 | B2 | | 11/2002 | Kessen et al. |
| 6,789,810 | B2 | * | 9/2004 | Strong ................. 280/124.128 |
| 2004/0256830 | A1 | * | 12/2004 | Omi et al. ............ 280/124.147 |
| 2006/0220338 | A1 | * | 10/2006 | Orimoto et al. ...... 280/124.141 |

* cited by examiner

Primary Examiner—Paul N. Dickson
Assistant Examiner—Laura B. Rosenberg
(74) Attorney, Agent, or Firm—Clements Walker; F. Rhett Brockington

(57) ABSTRACT

The invention is a suspension spring apparatus for a vehicle wherein the suspension spring maintains a linear alignment irrespective of the position of the articulating strut, where the articulating strut is selected from the group consisting of: control arms, axle arms, solid axles, adjustable spring tensioning devices, and longitudinal struts. The apparatus is comprised of a compression spring mounted between a pivoting lower seat and a pivoting upper seat, where the pivoting lower seat is coupled to the articulating strut and the pivoting upper seat is coupled to a support element. The support element is static, and serves to support the suspension system, and to distribute the forces generated by the suspension system. The pivoting lower seat and the pivoting upper seat can, in combination, pivot through substantially the same plane as the articulating strut, such that when there is a change in angle of the articulating strut with respect to the support element there is a commensurate change in the pivoting lower seat and the pivoting upper seat. The compensation maintains the compression spring aligned linearly between the pivoting lower seat and the pivoting upper seat. Compression and expansion occurs along the centerline of the spring, and there is no transverse curvature, or other deformation of the spring.

24 Claims, 9 Drawing Sheets

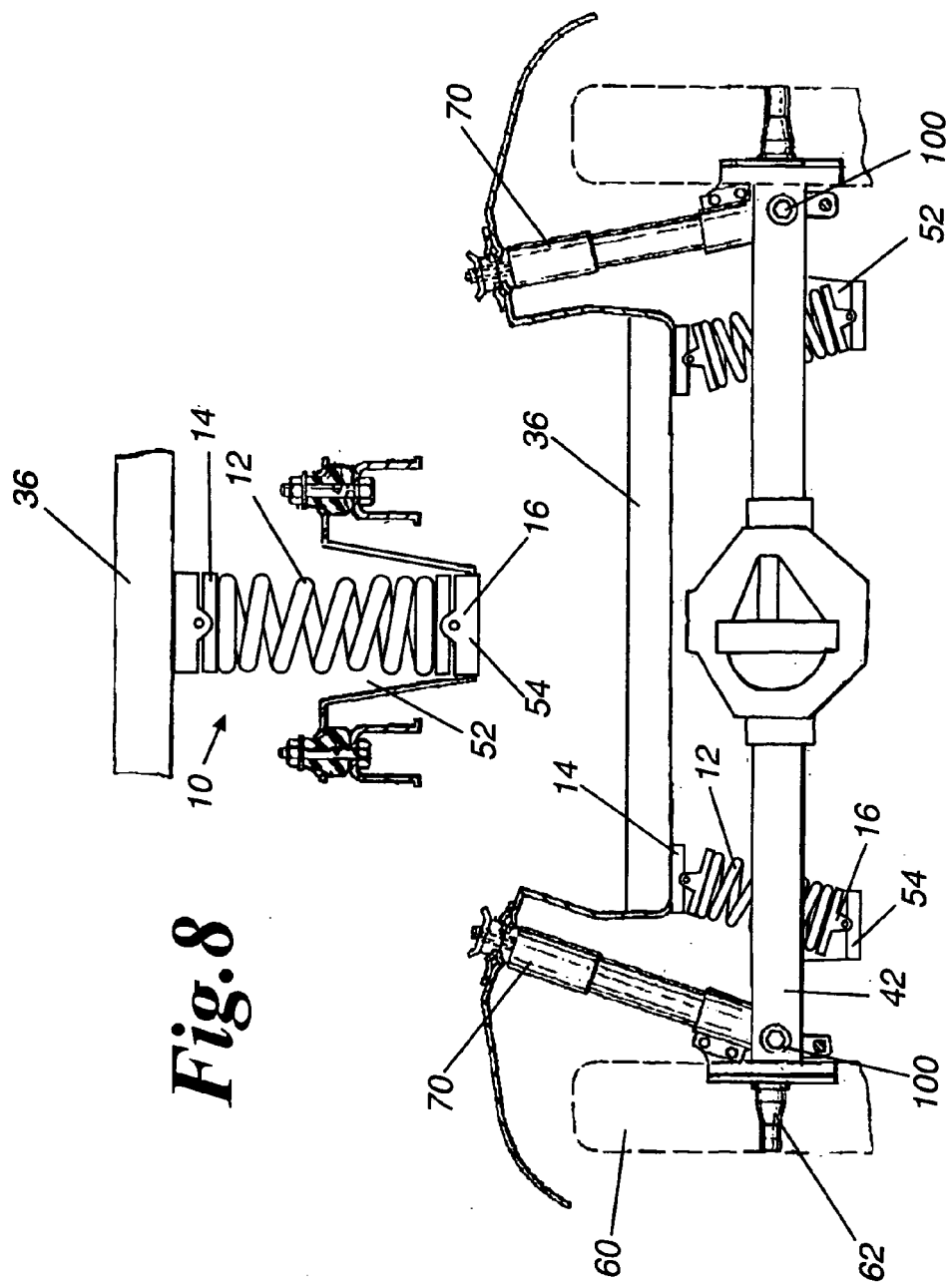

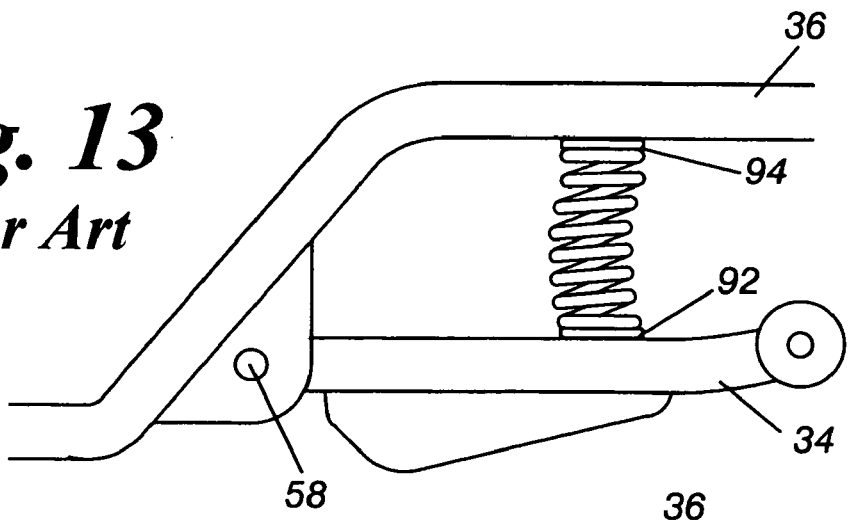
Fig. 13 *Prior Art*
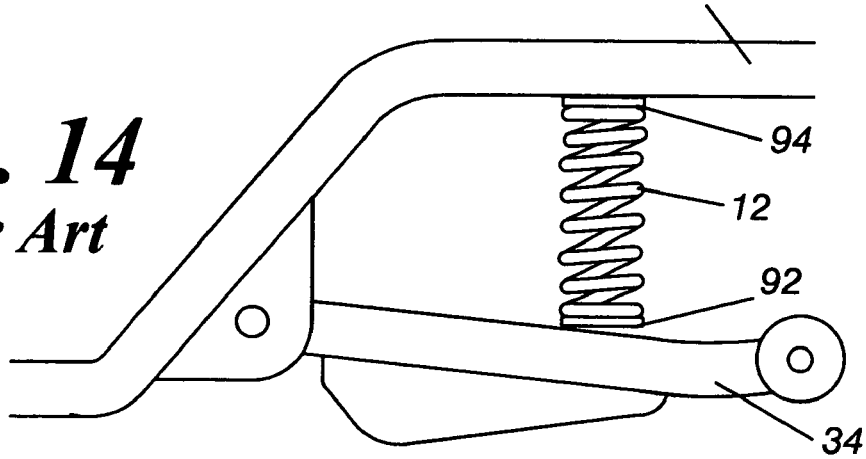
Fig. 14 *Prior Art*
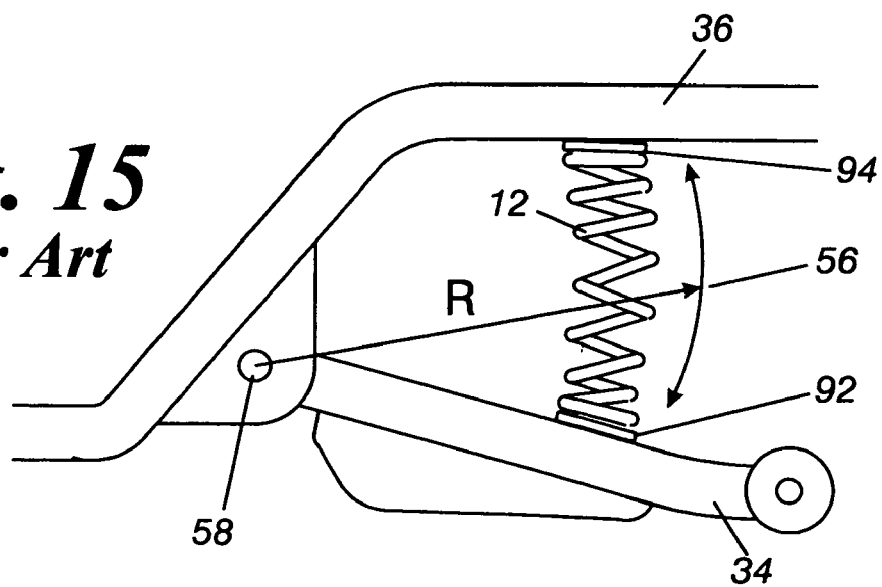
Fig. 15 *Prior Art*

LINEAR SUSPENSION SPRING

BACKGROUND OF THE INVENTION

1. Field of the Invention

The present invention relates to a helical compression spring for a vehicle suspension, and more particularly to a mounting system for the helical compression spring that maintains the spring in a linear orientation over the entire range of compression.

2. Description of the Related Arts

In general, a vehicle suspension is provided with a substantially helical compression spring, where the compression spring works in concert with a shock absorber. The compression spring can be substantially coaxial to a telescoping strut, or a shock absorber that simultaneously serves as a telescoping strut. In the case where the compression spring is mounted having an annular shock absorber (i.e., a coil-over or MacPherson strut), the spring is typically held between a lower spring seat that is affixed to the piston, and an upper seat that is usually affixed to the frame. In this configuration, the shock absorber has some degree of movement within the diameter to the coils of the spring to adjust to movement of the suspension. Alternatively, the compression spring can be used independently with a shock absorber, where the shock absorber and the spring are not combined in a unified part. The obvious advantages of a shock absorber and a compression spring working independently are that there are no interdependent geometrical size limitations. The shape and size of the spring need not be determined by the shape and size of the shock absorber. The advantages of combining the dampening shock absorber and the spring are that they tend to take up less space, and the combination would appear to be more effective because the reactive forces are unified. Typically, a suspension system for a two axle vehicle has one shock absorber and one spring per wheel. This is true, whether the suspensions are independent or unified, as in the case of a solid axle. All suspensions share the common feature that when the wheel is positively stressed by a change in the static loaded position by impact with a raised surface, the wheel moves upward to a position where the stress force is about equal to the resistive force produced by the spring and shock absorber. With modern suspensions, the movement of the wheel is substantially perpendicular to the road so that the traction remains constant and there is not a big difference in wear characteristics when comparing one side of the tire to the other. The control arm system, which is an articulating strut or a combination of articulating struts, limits the range of motion of the wheel (and axle where appropriate) to substantially perpendicular movement. The movement of the articulating strut is substantially radial, moving through an arc as the wheel (and the axle in some cases) moves upward or downward. The articulating strut incurs an incremental bending moment as a result of the movement of the wheel. The movement of the wheel produces a stress force at a stress point (e.g., incremental from the static load) that is countered by a resistance force at a resistance point (e.g., incremental from the static load), where the resistance point is offset from the stress point by a distance X. The stress point is typically designated at the center of the tread width of the tire. The resistance force is substantially generated by the spring, and so the resistance point is the location where the spring, or an extending strut of the spring, is in connection with the articulating strut. In the case where the compression spring is mounted on the shock absorber, then the resistance point is where the shock absorber attaches to the articulating strut. The shock absorber reacts to the bending moments, which in turn causes the spring to react. As the motion of the articulating strut is angular, the shock absorber is usually pivotally connected to facilitate linear movement of the rod through the piston. The piston is typically pivotally connected to the articulating strut, and the rod is pivotally connected to the chassis or frame. This type of suspension is described by Halford et al., U.S. Pat. No. 2,992,015, and is commonly known as a coil-over strut, or MacPherson strut. Muhr et al., in U.S. Pat. No. 4,903,985, in the background of the disclosure examines the bending moment of a shock absorber-spring combination. Muhr et al., reports that others have taught that the further the resistance point is from the stress point, the greater the bending moment. By way of example, if the shock absorber is connected to the control arm X inches from the inside rim of a Y inch wide tire, and the spring is coaxial with the strut, then the point of resistance is X inches, plus half the width of the tire (Y/2) for a total distance of inches (X+Y/2) from the point of stress. If the tire is wider, the difference is larger. The greater the difference in distance between the point of stress and the point of resistance, then the greater the strain, and the greater the bending moment of the strut. In terms of a shock absorber, the higher the bending moment, the greater the drag resistance necessary to move the rod through the piston. To correct for the imbalance, a solution has been to angle the spring so that the centerline of the spring is aligned with the point of stress. Accordingly, using this type of suspension, wherein the spring is positioned between a lower spring seat that is attached to the piston and an upper spring seat that is mounted to the frame, it has been taught to arrange the cylindrical helical compression spring to be offset from the shock absorber axis, such that the centerline of the spring is preferably aligned with the stress point. Vectorially aligning the spring reputedly reduces the bending moment acting upon the shock absorber. In the static loaded state, the piston rod of the shock absorber is reported to be largely free of shear forces, however, the configuration does not ameliorate the problem during the non-static state. When the wheel moves either upward or downward, the spring alignment is lost because the alignment of the resistance point does not adjust for the position change of the wheel. When the wheel flexes upward, the control arm of the suspension pivots upward through an arc. For instance, a one foot control arm deflected 25° will travel through a 5 inch secant. If the angle of a coil-over strut is approaching 60° with respect to the control arm, then a strut that is approximately 1.5 times the length of the control arm will deflect to a more acute angle of approximately 50°. The overall length of the strut will compress about 22%. A spring having a length that is two-thirds the length of the strut will be compressed 33%. A deflection of this magnitude creates a large bending moment on the strut, as it is being flexed through a 25° arc in a very short period of time. Angling the spring possibly helps under static conditions, but because the stress point changes as the control arm pivots, the spring is often out of alignment to produce the most effective resistance, and the level of performance is not as good as it would be if the spring were properly aligned. While the coil-over strut has the apparent advantage that the spring is substantially coaxial with the helical compression spring, it is limited in that the shock absorber must be sufficiently robust to serve as both a pneumatic cylinder dampener and as the strut that transfers the suspension forces between the control arm and the chassis. As previously discussed, the bending moment produced during a deflection of the wheel can cause frictional resistance, which in turn wears out the shock, creates noise, and is a limiting factor as to the force it takes to bottom out the suspension.

In the second type of suspension, wherein the helical compression spring and the shock absorber are independently connected to the articulating member, as before it is desired that the stress forces and the resistance forces be aligned. In the case of independent suspensions, the articulating member is either an axle arm, a control arm, or both. In all cases, the articulating strut traverses through an arc as the wheel deflects either upward or downward to smooth out the road surface variations. What is needed is an apparatus that will provide a spring that will compress or extend linearly, even as the articulating strut moves angularly. A linearly deflected spring reacts along its centerline, thereby producing a substantially linear response to the stressing forces. When the spring is linearly compressed, its coils act uniformly in response to the stressing force, and the spring is not curved, and the coils are not unequally compressed. Since the spring is not curved there is no transverse reaction generated when the spring recoils. The attendant shock absorber provides dampening to vibrations that are aligned with the piston, and is largely ineffective at dampening transverse vibrations, so that when the spring deflects from linearity the performance of the shock absorber deteriorates. Furthermore, since the compression and recoil are uniform, the spring will have a longer wear life.

In a variation of the second type of suspension, the helical compression springs and the shock absorbers are independently connected to a solid axle. This type of suspension is commonly associated with heavy load vehicles like trucks, but it is also used with high performance vehicles, and particularly muscle cars or dragsters where there is a lot of torque. Ford's 2005 Mustang has a solid rear axle three-link suspension. The solid rear axle suspension is robust, maintains constant track, toe-in and camber relative to the road surface, and it keeps body roll well under control. A central torque control arm is fastened to the upper front end of the differential, while trailing arms are located near each end of the axle. The lightweight, tubular Panhard rod is parallel to the axle and attached at one end to the body, and at the other end to the axle. The Panhard rod stabilizes the rear axle side-to-side, as the wheels move through jounce and rebound. It also firmly controls the axle during hard cornering. The shocks are located on the outside of the rear structural rails, near the wheels, reducing the lever effect of the axle and allowing more precise, slightly softer tuning of the shock valves. As configured, the compression springs are connected directly to the axle, inboard of the shock absorbers. The performance characteristics of a rigid axle are such that often when one spring is in extension, the spring on the opposing side is in compression. The Panhard rod tends to compensate for this by partially compressing the spring in extension, however, it does not eliminate this characteristic entirely, and the axle and any longitudinal struts will be articulating through a small rotation. The compression springs will be transversely deflected. What is desired is a linear suspension spring that will compress or extend linearly, even as the articulating strut moves angularly.

SUMMARY OF THE INVENTION

The invention is a suspension spring apparatus for a vehicle wherein the suspension spring maintains a linear alignment irrespective of the position of the articulating strut. The apparatus is comprised of a compression spring mounted between a pivoting lower seat and a pivoting upper seat, where the pivoting lower seat is coupled to an articulating strut that can rotate through an arc in a plane, and the pivoting upper seat is coupled to a support element. Typically, an articulating strut is selected from the group consisting of: control arms, axle arms, solid axles, adjustable spring tensioning devices, and longitudinal struts. The articulating strut is usually connected to the spindle or the axle onto which the wheel is mounted. The support element is selected from the group consisting of: frames, chassis, reinforced body components, suspension spring wells, support elements for secondary control arms, and adjustable spring tensioning devices. The support element is static, and serves to support the suspension system, and to distribute the forces generated by the suspension system. The pivoting lower seat and the pivoting upper seat can, in combination, pivot through substantially the same plane as the articulating strut, such that when there is a change in angle of the articulating strut there is a commensurate change in the pivoting lower seat, and the pivoting upper seat. The compensation maintains the compression spring aligned linearly between the pivoting lower seat and the pivoting upper seat. Compression and expansion occurs along the centerline of the spring, and there is no transverse curvature or other deformation.

The pivoting lower seat is comprised of a planar base plate having a front surface and a rear surface, an axial coupling integral with the rear surface, and a retainer integral with the front surface. The retainer centers the compression spring on the base plate. The axial coupling hingedly connects the pivoting lower seat to the articulating strut. The pivoting lower seat is preferably fitted with an insulator on the front surface of the planar base plate to dampen noise, and reduce scraping produced by contact between the compression spring and the planar base plate. The pivoting upper seat is similarly comprised. It has an opposing planar base plate having an opposing front surface and an opposing rear surface, an opposing axial coupling integral with the opposing rear surface, and a second retainer integral with the opposing front surface. The second retainer aligns the compression spring on the base plate. The axial coupling hingedly connects the pivoting upper seat to the support element. An insulator added to the opposing planar base plate of the second seat further dampens and prevents noise produced by contact between the compression spring and the second seat. The suspension spring apparatus assures that the front surface of planar base plate and the opposing front surface of the opposing planar base plate are self-adjusting, so as to be substantially parallel through all angles of the articulating strut.

The linear suspension spring is preferably a helical compression spring, albeit it is recognized that others will work, and will benefit from the disclosed advantages of the instant invention.

An advantage of the disclosed invention is that, unlike suspension spring apparatus in the past that produce a bending moment that is a function of the degree of deflection through which the wheel has moved, the springs centerline adjusts so as to be directed toward the point of stress force produced by the wheel motion. There is no need for a complex curved and/or compound spring, and the suspension can be engineered so as to have optimum dampening by the shock absorber throughout the motion of the wheel. Another advantage is that the spring is substantially free of transverse deformation, which shortens the life of the spring and creates vibrations that are ineffectively dampened by the shock absorber.

The suspension spring apparatus further includes a modified coil-over MacPherson type of strut where, in effect, the shock absorber is also mounted between the pivoting lower seat and a pivoting upper seat. The planar base plate of both pivoting spring seats is fitted with a linkage for connecting the shock absorber. In contrast to the prior art where the spring is mounted to the shock absorber, the spring is mounted between the spring seats. The linkage for connecting the shock absorber to the planar base plate is preferably free moving, so that the shock can move independent of the orientation of the pivoting lower seat and the pivoting upper seat.

It is anticipated that the invention can be retrofitted to existing suspension systems through the proper selection of spring seats and springs, and in the case of the modified MacPherson strut, the selection of the properly sized shock absorber. The invention is compatible with automated suspension features like ARC (automatic ride control), wherein the stiffness of the suspension and leveling are adjustable. Furthermore, the disclosed invention is adaptable to independent suspensions as well as solid axle suspensions, both two and four wheel drive, and suspensions, where the shock absorber and the suspension spring are coaxial, or are separated.

BRIEF DESCRIPTION OF THE DRAWINGS

The above stated object and following description will become readily apparent with reference to the accompanying drawings, wherein like reference numerals denote like elements.

FIG. 7 is a rear view of the solid rear axle suspension shown in FIG. 5, wherein the conventional suspension spring has been replaced with a linear suspension spring apparatus having a pivoting upper seat and a pivoting lower seat. The spring well is flared to allow for greater deflection.

FIG. 8 is a front view of the invented linear suspension spring in an enlarged spring well, as shown in FIG. 7.

FIG. 13 is a side view of a prior art conventional suspension spring, wherein the spring is nearly fully compressed and curved slightly toward the pivot point.

FIG. 14 is a side view of a prior art conventional suspension spring, wherein the spring is statically loaded and is partially compressed.

FIG. 15 is a side view of a prior art conventional suspension spring, wherein the spring is unloaded and nearly fully extended, and, as such, is curved slightly away from the pivot point.

DETAILED DESCRIPTION OF THE INVENTION

Figure 16:
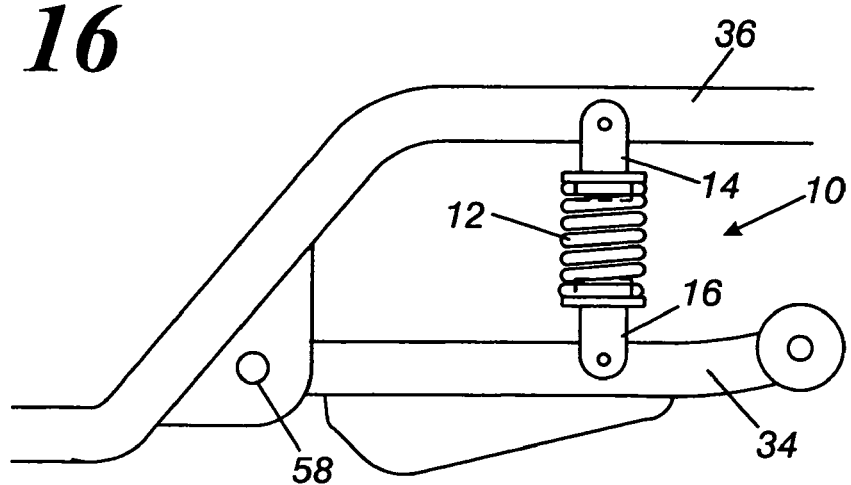
FIG. 16 is a side view of the invented linear suspension spring apparatus, wherein the spring is nearly fully compressed, and is equally compressed and straight with respect to its centerline.
Figure 17:
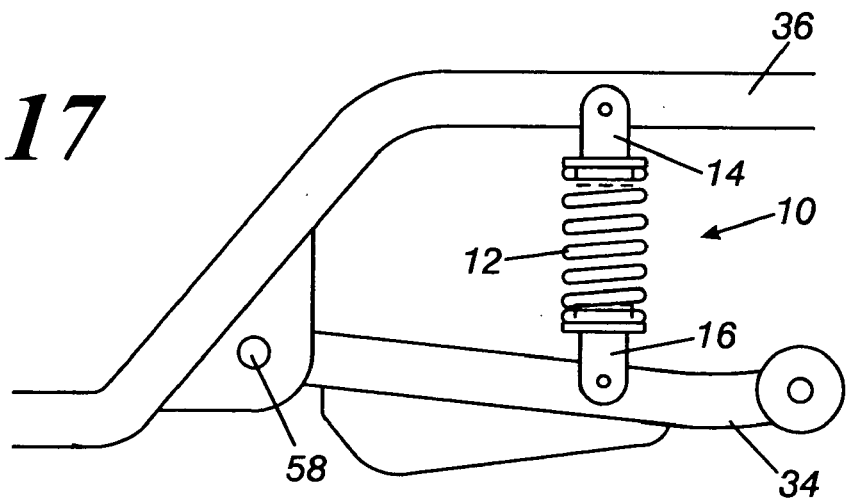
FIG. 17 is a side view of the invented linear suspension spring apparatus, wherein the spring is statically loaded, and is partially and equally compressed, and straight with respect to its centerline.
Figure 18:
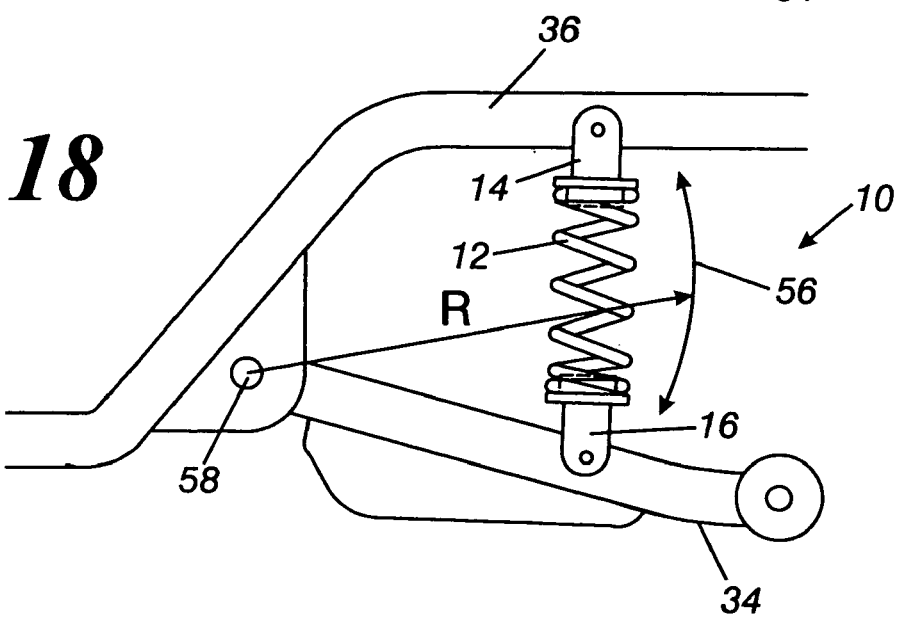
FIG. 18 is a side view of the invented linear suspension spring apparatus, wherein the spring is unloaded and extended, and is equally compressed and straight with respect to its centerline.

The invention is a linear suspension spring apparatus for a vehicle, wherein the suspension spring is mounted between a pivoting lower seat and a pivoting upper seat. The suspension spring is a helical compression spring, and characteristically of helical compression springs, the spring resists deformation from the centerline, as well as from compression. Deformation away from the centerline produces curvature of the spring, so that the coils on one side of the spring will be more compressed and the coils on the other side are more expanded. The greater the compression, the greater the force the spring exerts. Therefore, when the spring is mounted between two seats having substantially planar bases, a compression spring exerts equalizing forces on the opposing seats to minimize the compression forces, and this minimum is attained when the opposing seats are substantially parallel to each other. In the suspension apparatus, one of the pivoting seats is mounted to an articulating strut and the other pivoting seat is mounted to a support element that is substantially static. Arbitrarily, the pivoting lower seat has been designated as the seat that is attached to the articulating strut, and the pivoting upper seat is attached to the support element. When the articulating strut is in the statically loaded position, the suspension spring is partially compressed by the weight of the vehicle. When the vehicle is more heavily loaded or, when encountering an elevational change in the road surface, the wheel moves upward, causing the articulating strut to rotate upward, such that the angle between the support element and the articulating element is more acute. The change in angle causes a slight change in angle of the first seat, and this change is immediately compensated for by the pivoting upper seat to keep the respective seats parallel. The action of the invented linear suspension spring apparatus 10 is illustrated in FIGS. 16–18. Referring to FIG. 17, the spring 12, is shown in the statically loaded position, where it is partially compressed. The pivoting lower seat 16 is hingedly connected to the articulating strut 34. The pivoting upper seat 14 is hingedly connected to the support element 36. The support element is a generic term for suspension components selected from the group consisting of: frames, chassis, reinforced body components, suspension spring wells, support elements for secondary control arms, and adjustable spring tensioning devices, where the support element is substantially static. The articulating strut is a generic term for suspension components selected from the group consisting of: control arms, axle arms, solid axles, adjustable spring tensioning devices, and longitudinal struts. The articulating strut 34 moves through an arc 56, pivoting at point 58. In FIG. 16, the articulating strut 34 has rotated upward, causing the spring to compress. The spring pressing against the pivoting lower seat 16 and the pivoting upper seat 14 causes the two seats to adjust for the more acute angle of the articulating strut 34. The spring 12 maintains a substantially linear shape, even though it is more compressed. At the top of the movement of the articulating strut 34, the suspension spring attains its maximum compression, and the pivoting lower and upper seats, acting in unison, adjust for the change in angle. Referring to FIG. 18, when the load is removed or the elevation in the road smoothes out, the articulating strut 34 moves downward to a less acute angle, and again the apparatus 10 adjusts for the new angle. The invention is contrasted with the reaction of a prior art suspension spring, as shown in FIGS. 13–15. In FIG. 14 the spring is mounted between a first static seat 92 and a second static seat 94. The lower static seat 92 is mounted to the articulating strut 34, and the upper static seat 92 is mounted to the support element 36. The cylindrical spring 12 is substantially linear in the statically loaded state, however, when it is compressed as shown in FIG. 13, the more acute angle causes the spring to deform, bending toward the pivot point 58. The deformation can produce translational vibrations that are out of plane with an accompanying shock absorber, and therefore will be ineffectively dampened. FIG. 15 illustrates the prior art when the spring is expanded, for instance when the vehicle's suspension adjusts for a low load condition. The spring is deformed in the opposite direction, and the coils are unevenly expanded. Typically, the spring has to adjust from one state to another state very quickly. For instance, when a vehicle encounters a depression in the road, such as a pot hole, the spring will quickly move from an expanded state as shown in FIG. 15 to a compressed state as shown in FIG. 13 as the vehicle passes the pot hole, causing the spring to oscillate back and forth. The apparatus 10 eliminates these oscillations, as the spring is never deformed.

Figure 11:
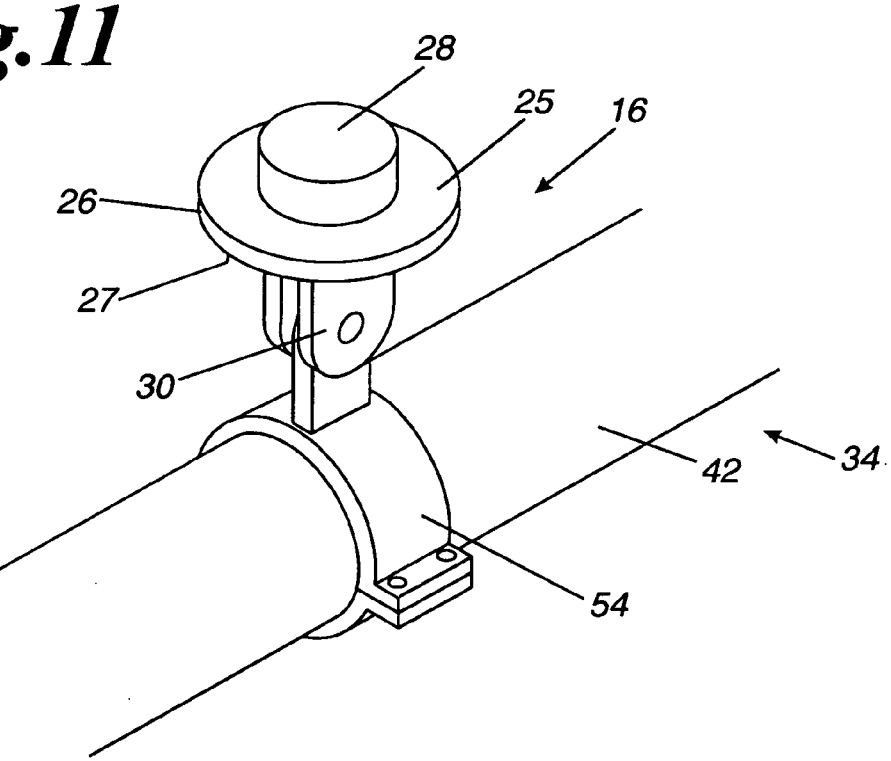
FIG. 11 is a perspective view of a pivoting lower seat with a mounting clamp for fastening to an articulating strut such as an axle.

FIG. 11 is perspective view of the lower pivoting seat 16 fastened to an articulating strut 34, where the articulating strut is an axle 42. The seat 16 is comprised of a substantially planar base 26 having a front surface 25, a rear surface 27, a retainer 28, and axial coupling 30, which is axially connected to a mounting clamp 54. The mounting clamp 54 is fastened to the articulating strut 34. The retainer 28 centers the spring 12 on the seat 16.

Figure 12:
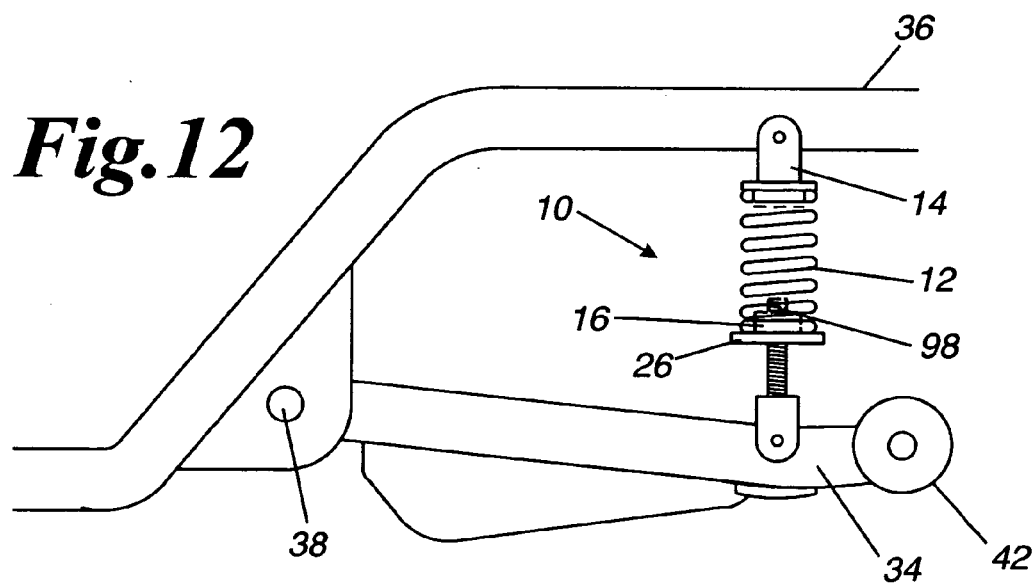
FIG. 12 is a side view of the linear suspension spring apparatus with an adjustable compression pivoting lower seat.

FIG. 12 is a side view of an articulating strut 34 fitted with a lower pivoting seat that has a means 98 for adjusting the position of the planar base plate 26. The means enables the tension of the suspension to be increased or decreased. The illustrated means is substantially a seat having a height adjustable connection to a pinion. As illustrated, the means 98 is shown on the lower pivoting seat, albeit it would be equally effective if it were on the upper pivoting seat or on both. Also, it is anticipated that an equivalent means would be a seat attached to a mounting clamp having a height adjustable connection to a pinion.

Figures 9, 10:
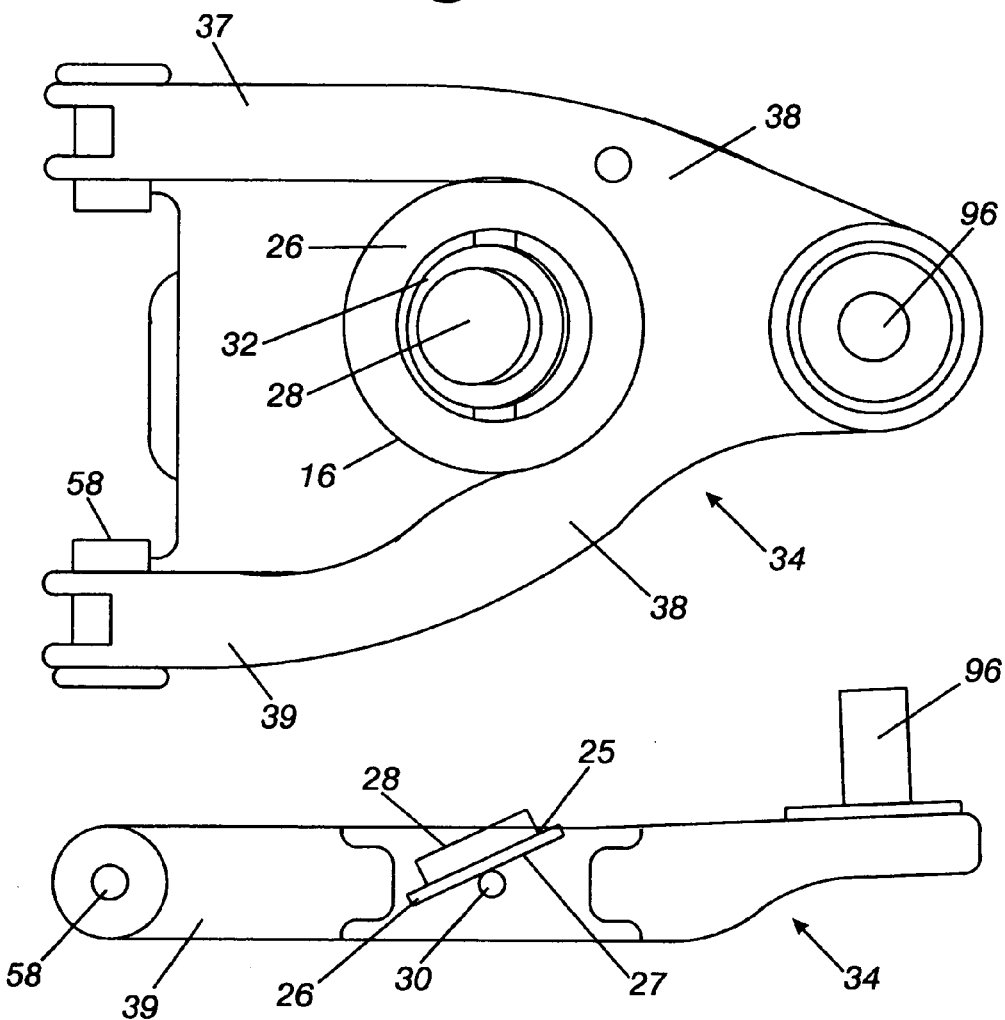
FIG. 9 is a plan view of a control arm fitted with a pivoting lower spring seat.
FIG. 10 is a side view of the control arm shown in FIG. 9, fitted with a pivoting lower spring seat.

FIG. 9 is a top view of a lower control arm 38 with a pinion 96 for connecting a spindle. The lower control arm 38 serves as an articulating strut 34, and is typically used in a front wheel independent suspension. The pivoting lower seat 16 rotates between a front arm 39 and a rear arm 37. The lower control arm 38 pivots at 58. The lower seat has a retainer 28, an insulator 32, a planar base plate 26 and an axial coupling 30 (not visible in FIG. 9). FIG. 10 is a side view of the control arm illustrated in FIG. 9. As can be seen, the front and rear arms, 39 and 37, support the axial coupling 58, so that the seat can rotate in the same plane as the control arm 38.

Figure 3:
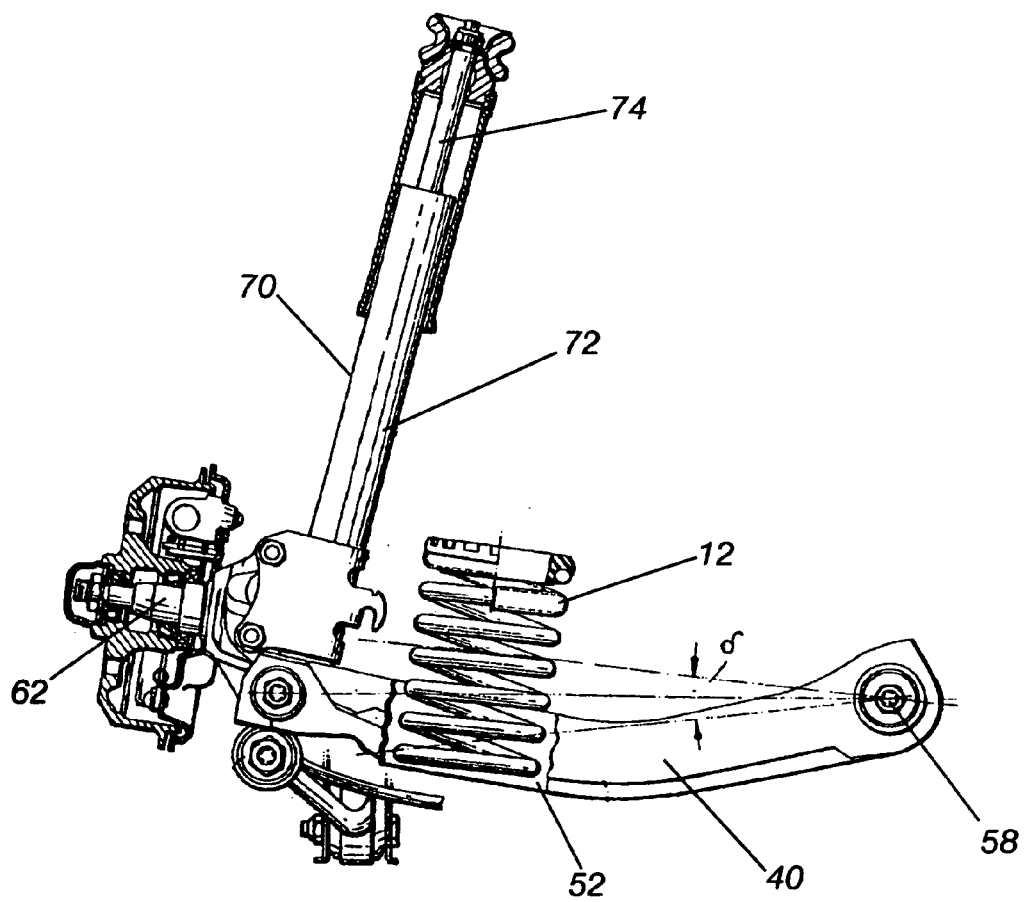
FIG. 3 is a side view of an independent suspension rear axle arm fitted with a prior art shock absorber and a conventional suspension spring, where the rear axle arm is an articulating strut.
Figure 4:
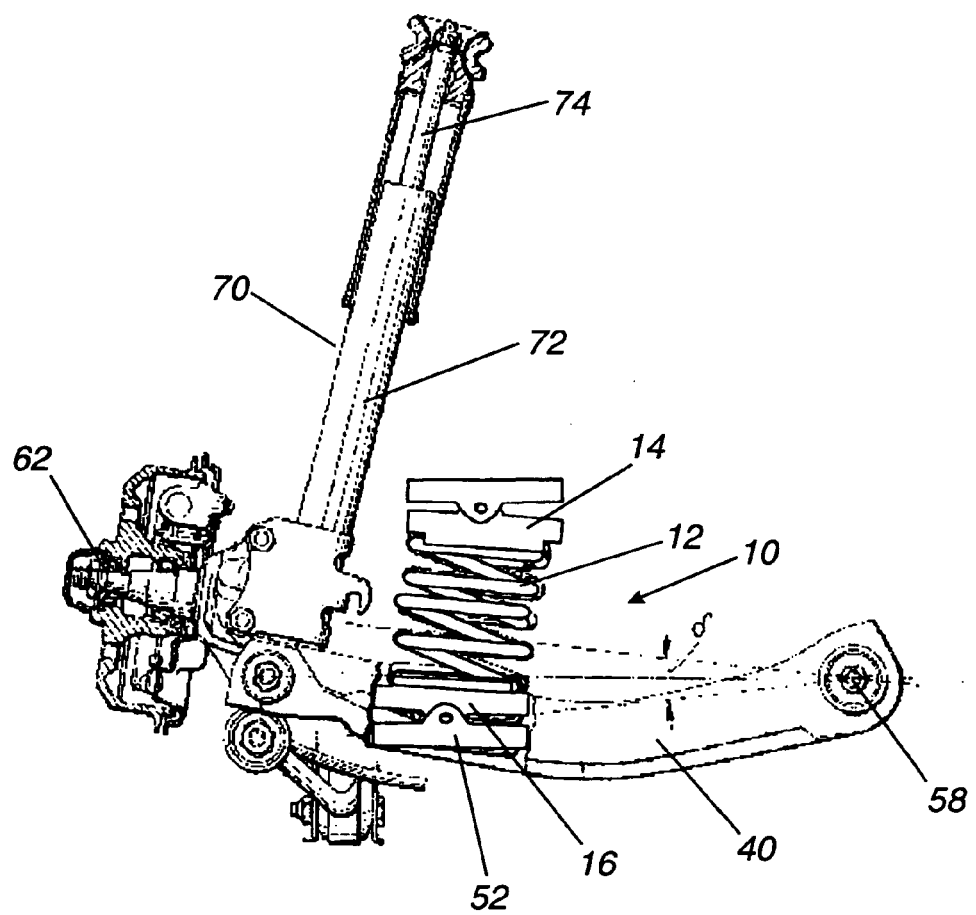
FIG. 4 is a side view of the independent suspension rear axle arm shown in FIG. 3, wherein the conventional suspension spring has been replaced with a linear suspension spring apparatus having a pivoting upper seat and a pivoting lower seat. The present invention enables the spring to eliminate the transverse deflection and subsequent oscillations observed with a prior art conventional suspension spring setup.

Referring to FIG. 3, which is a side view of an independent suspension rear axle arm 50 fitted with a prior art shock absorber 70, and a conventional suspension spring 12. The rear axle arm 50 articulates at pivot point 58. The spindle 62 is attached to the rear axle arm 50. The suspension spring is seated in a suspension spring well 52. The independent suspension rear axle arm 50 is unique in that the spring is positioned so close to the spindle, and hence the wheel, which are the point source for the stress force. The positioning aligns the resistance force of the spring reasonably close to the stress force. A disadvantage, is that the spring will have to going through an incrementally larger change in distance than if it were located more inboard, an the larger change in distance during a reaction by the suspension will tend to exacerbate the tendency to deform during compression and expansion. In contrast, FIG. 4 is a side view of the independent suspension rear axle arm 40 shown in FIG. 3, wherein the conventional suspension spring has been replaced with a linear suspension spring apparatus 10 having a pivoting upper seat 14 and a pivoting lower seat 16. The present invention enables the spring 12 to eliminate the transverse deflection and subsequent oscillations observed with a prior art conventional suspension spring setup.

Figures 5, 6:
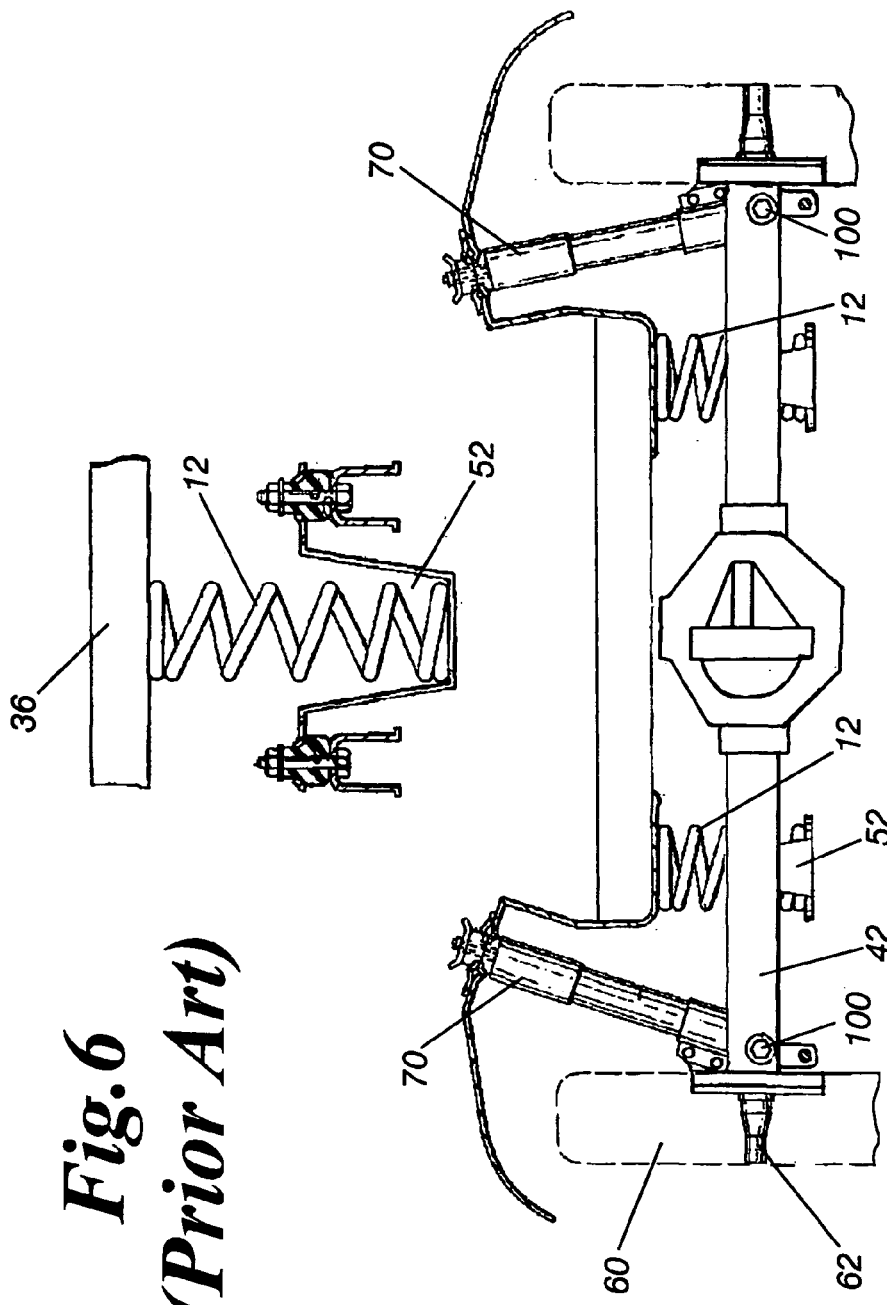
FIG. 5 is a rear view of a solid rear axle suspension fitted with a shock absorber and a prior art conventional suspension spring, wherein the shock absorbers and the suspension springs are mounted between the solid rear axle and the frame.
FIG. 6 is a front view of a prior art conventional suspension spring well, as shown in FIG. 5.

The linear suspension spring apparatus 10 can be used with a solid axle as shown in FIG. 7. In the prior art, as shown in FIG. 5, a solid rear axle 42 has a pair of shock absorbers 70 and a pair of compression springs 12. The shock absorbers 70 and the suspension springs 12 are mounted between the solid rear axle 42 and the frame 36. The springs are in wells 52. In the case of a solid axle the pivot point is less defined, but none-the-less the axle is still an articulating strut. If the right or left wheel 60 individually deflects upward or downward, the action is through an arc, and the spring on the opposing side is extended or compressed, respective to the deflection. The shock absorber reacts in a similar fashion. Jointly, the shock absorber, the spring, and any longitudinal struts 100, (perpendicular to the plane of the paper), act as the pivot point. The spring well 52, as shown in FIG. 6, is more open at the top to allow for the movement of the spring.

FIG. 7 is a rear view of the solid rear axle suspension shown in FIG. 5, wherein the conventional suspension spring has been replaced with a linear suspension spring apparatus having a pivoting upper seat and a pivoting lower seat. The spring well is flared to allow for greater deflection. The linear suspension spring apparatus 10 fitted to the same solid axle suspension of FIG. 5 is shown in FIG. 7. The linear suspension spring apparatus has a pivoting upper seat 14 and a pivoting lower seat 16. The spring well, shown in FIG. 8, is slightly less flared, as the spring does not deform during extension or compression. As shown, the spring wells are positioned closer to the wheels 62 to improve the resistance-stress alignment, and consequently the springs are slightly angled to contact the frame 36. Note, even though the springs are angled, their movement is still along the centerline of the spring 12, as the pivoting upper and lower seats compensate for any change in angle.

Figure 1:
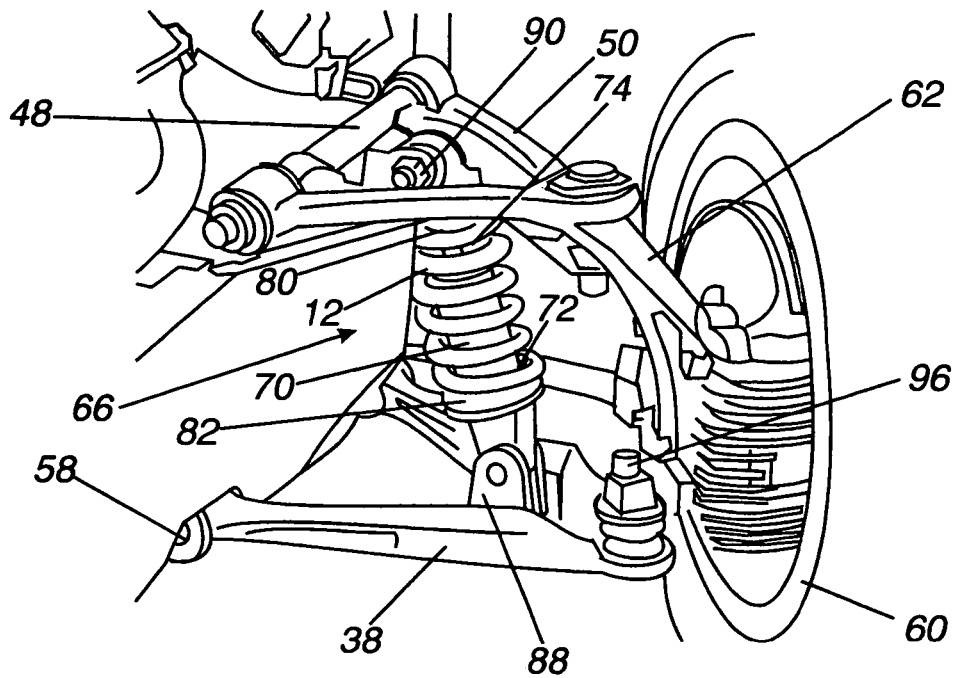
FIG. 1 is a perspective view of a prior art coil-over MacPherson type strut mounted between a lower control arm and an upper control arm, where both arms are articulating struts for a front wheel independent suspension.
Figure 2:
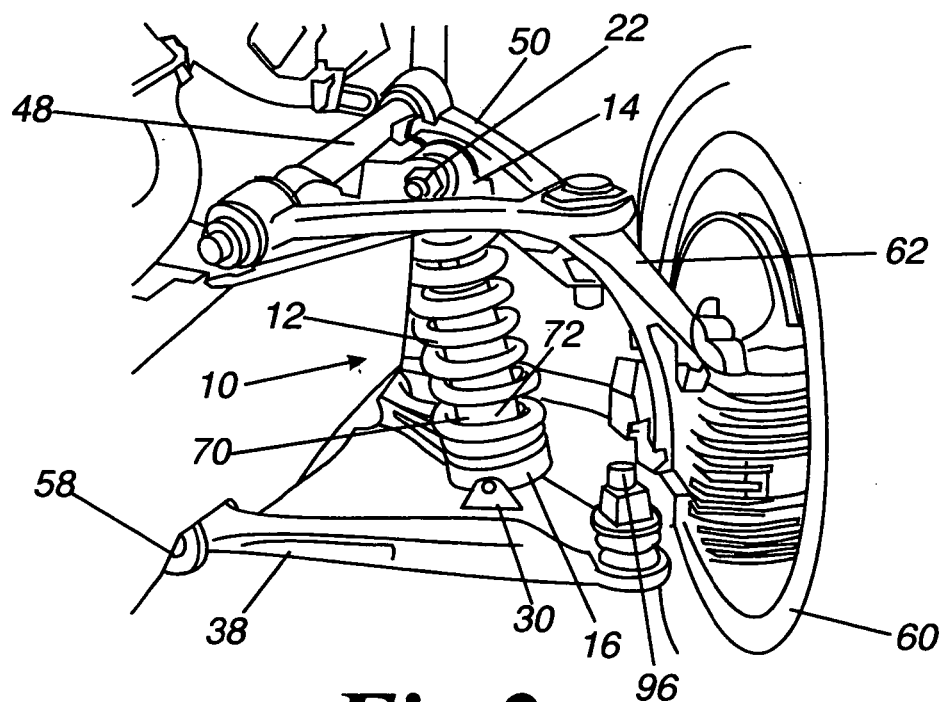
FIG. 2 is a perspective view of an embodiment of the present invention, wherein the traditional coil-over MacPherson type strut as shown in FIG. 1 is replaced with a linear suspension spring apparatus having a pivoting upper seat and a pivoting lower seat, and an annular shock absorber that is pivotally mounted between the lower and upper control arms.

FIG. 1 is a perspective view of a prior art front wheel independent suspension having a coil-over MacPherson strut 66. The spindle 62 is mounted between a lower control arm 38 and an upper control arm 50. The coil-over strut 66 is attached to an upper joint 90 on the frame 48 and a lower joint 88 on the lower control arm 38. The lower control arm 38 and the upper control arm 50 limits the spindle 62 to perpendicular movement and rotational movement through a plane parallel to the ground for steerage. While both the lower control arm 38 and the upper control arm 50 articulate, only the lower is connected to the coil-over strut 66. The compression spring 12 is mounted between an upper stationary seat 80 that is usually affixed to the frame 48, and a lower stationary seat 82 that is usually affixed to the piston 72 of the shock absorber 70. When the lower control arm 38 articulates, the shock absorber 70 rotates, adjusting for the new angle at the pivoting upper joint 90 and the lower joint 88. The compression spring seated in the lower stationary seat 82 partially compensates for the change in angle, however since the upper stationary seat 80 is fastened to the frame 48, full compensation is not achieved. Furthermore, as has been discussed at length in the prior art, the shock absorber undergoes a significant bending moment, because the spring does not react until the piston rod 74 moves causing compression of the spring 12. The shock absorber 74 has to be sized larger to withstand the stresses than if the spring 12 was in contact with the lower control arm 38, because the stress forces would be shared by the shock absorber 74 and the spring 12. The cost of a larger shock absorber is much greater than the cost of a larger spring. Referring to FIG. 2, wherein the traditional coil-over MacPherson type strut as shown in FIG. 1 is replaced with a linear suspension spring apparatus having a pivoting upper seat 14 and a pivoting lower seat 16, and an annular shock absorber 70 that is pivotally mounted between the lower and upper control arms. The spring 12 is in contact with the lower control arm 38 through the pivoting lower seat 16. The pivoting lower seat has a lower axial coupling 30 that enables the orientation of the seat to adjust with any deflection of the lower control arm 38. In the illustrated embodiment, the lower joint 88 could be utilized as the lower axial coupling 30. The lower control arm 38 pivots at 58 as previously described for articulating strut 34. Likewise, the upper axial coupling 22 of the pivoting upper seat 14 can be connected using the existing upper joint 90. The shock absorber can be connected via the upper joint 90 and the lower joint 88, or through an auxiliary coupling means that is part of the pivoting upper and lower seat. Employing the linear suspension apparatus, the spring is always linear throughout all deflections of the suspension, and the stress forces are distributed to the spring, therein reducing the bending moment incurred by the shock absorber.

It should be apparent to one skilled in the art that the above-described embodiments are merely illustrative of but a few of the many possible specific embodiments of the present invention. Numerous and various other arrangements can be readily devised by those skilled in the art without departing from the spirit and scope of the invention as defined in the following claims.

What I claim is:

1. A suspension spring apparatus for a vehicle, said apparatus comprising: a compression spring mounted between a pivoting lower seat and a pivoting upper seat; wherein the pivoting lower seat and the pivoting upper seat are not rigidly connected by a telescoping strut; wherein the pivoting lower seat is coupled to an articulating strut that can rotate through an arc in a plane, and the pivoting upper seat is coupled to a support element; wherein the pivoting lower seat and the pivoting upper seat can, in combination, pivot through substantially the same arc in the plane as the articulating strut, such that when there is a change in angle of the articulating strut with respect to the support element, there is a commensurate change in the pivoting lower seat and the pivoting upper seat, therein maintaining the compression spring aligned linearly between the pivoting lower seat and the pivoting upper seat; and wherein said pivoting lower seat comprises a base plate with a front surface and a rear surface; an axial coupling integral with the rear surface that hingedly connects the pivoting lower seat to the articulating strut, where said axial coupling has a means for adjusting a position of the planar base plate, such that the tension on the spring is increased or decreased; and a retainer integral with the front surface, where the retainer aligns the compression spring on the base plate.

2. The suspension spring apparatus for a vehicle, as claimed in claim 1, wherein said pivoting lower seat further comprises an insulator fitted on the front surface of the planar base plate; where said insulator dampens and prevents noise produced by contact between the compression spring and the planar base plate.

3. The suspension spring apparatus for a vehicle, as claimed in claim 1, wherein said pivoting upper seat comprises: an opposing planar base plate having an opposing front surface and an opposing rear surface; an opposing axial coupling integral with the opposing rear surface; and a second retainer integral with the opposing front surface; wherein the second retainer aligns the compression spring on the base plate; and the axial coupling hingedly connects the pivoting upper seat to the support element.

4. The suspension spring apparatus for a vehicle, as claimed in claim 3, wherein said pivoting upper seat further comprises a second insulator fitted on the opposing front surface of the opposing planar base plate; where said second insulator dampens and prevents noise produced by contact between the compression spring and the opposing planar base plate.

5. The suspension spring apparatus for a vehicle, as claimed in claim 3, wherein the front surface of planar base plate adjusts to be substantially parallel to the opposing front surface of the opposing planar base plate through all angles of the articulating strut.

6. The suspension spring apparatus for a vehicle, as claimed in claim 5, wherein the compression spring is substantially a helical compression spring.

7. The suspension spring apparatus for a vehicle, as claimed in claim 5, wherein the articulating strut is selected from the group consisting of: control arms, axle arms, solid axles, adjustable spring tensioning devices, and longitudinal struts.

8. The suspension spring apparatus for a vehicle, as claimed in claim 5, wherein the support element is selected from the group consisting of: frames, chassis, reinforced body components, suspension spring wells, support elements for secondary control arms, and adjustable spring tensioning devices.

9. The suspension spring apparatus for a vehicle, as claimed in claim 3, wherein the pivoting upper seat further comprises a means for adjusting a position of the opposing planar base plate, such that the tension on the spring is increased or decreased.

10. The suspension spring apparatus for a vehicle, as claimed in claim 1, wherein a centerline of the linear aligned spring is angled, so as to be directed toward a point of stress force produced by movement of a wheel connected to the suspension.

11. The suspension spring apparatus for a vehicle, as claimed in claim 1, wherein a centerline of the linearly aligned spring is angled to have optimum dampening by a shock absorber.

12. The suspension spring apparatus for a vehicle, as claimed in claim 1, wherein, as the compression spring is linearly aligned between the pivoting lower seat and the pivoting upper seat, the spring is substantially free of transverse deformation, which shortens the life of the spring and creates vibrations that are ineffectively dampened by a shock absorber.

13. A The suspension spring apparatus for a vehicle, said apparatus comprising: a compression spring and an annularly positioned shock absorber mounted between a pivoting lower seat having a first linkage and a pivoting upper seat having a second linkage; wherein the pivoting lower seat is coupled to an articulating strut that can rotate through an arc in a plane, and the pivoting upper seat is coupled to a support element; wherein the pivoting lower seat and the pivoting upper seat can, in combination, pivot through substantially the same arc in the plane as the articulating strut, such that when there is a change in angle of the articulating strut with respect to the support element, there is a commensurate change in the pivoting lower seat and the pivoting upper seat, therein maintaining the compression spring aligned linearly between the pivoting lower seat and the pivoting upper seat; wherein the shock absorber can adjust independently to the change in angle of the articulating strut; and said pivoting lower seat comprises a planar base plate having a front surface and a rear surface; an axial coupling integral with the rear surface; and a retainer integral with the front surface; wherein the retainer aligns the compression spring on the base plate; and the axial coupling hingedly connects the pivoting lower seat to the articulating strut.

14. The suspension spring apparatus for a vehicle, as claimed in claim 13, wherein said pivoting lower seat further comprises an insulator fitted on the front surface of the planar base plate; where said insulator dampens and prevents noise produced by contact between the compression spring and the planar base plate.

15. The suspension spring apparatus for a vehicle, as claimed in claim 13, wherein said pivoting upper seat comprises: an opposing planar base plate having an opposing front surface and an opposing rear surface; an opposing axial coupling integral with the opposing rear surface; and a second retainer integral with the opposing front surface; wherein the second retainer aligns the compression spring on the base plate; and the axial coupling hingedly connects the pivoting upper seat to the support element.

16. The suspension spring apparatus for a vehicle, as claimed in claim 15, wherein said pivoting upper seat further comprises a second insulator fitted on the opposing front surface of the opposing planar base plate; where said second insulator dampens and prevents noise produced by contact between the compression spring and the opposing planar base plate.

17. The suspension spring apparatus for a vehicle, as claimed in claim 15, wherein the front surface of planar base plate adjusts to be substantially parallel to the opposing front surface of the opposing planar base plate through all angles of the articulating strut.

18. The suspension spring apparatus for a vehicle, as claimed in claim 17, wherein the compression spring is substantially a helical compression spring.

19. The suspension spring apparatus for a vehicle, as claimed in claim 17, wherein the articulating strut is selected from the group consisting of: control arms, axle arms, solid axles, adjustable spring tensioning devices, and longitudinal struts.

20. The suspension spring apparatus for a vehicle, as claimed in claim 17, wherein the support element is selected from the group consisting of: frames, chassis, reinforced body components, suspension spring wells, support elements for secondary control arms, and adjustable spring tensioning devices.

21. The suspension spring apparatus for a vehicle, as claimed in claim 15, wherein the pivoting upper seat further comprises a means for adjusting a position of the opposing planar base plate such that the tension on the spring is increased or decreased.

22. The suspension spring apparatus for a vehicle, as claimed in claim 13, wherein the pivoting lower seat further comprises a means for adjusting a position of the planar base plate such that the tension on the spring is increased or decreased.

23. The suspension spring apparatus for a vehicle, as claimed in claim 13, wherein a centerline of the linear aligned spring is angled so to be directed toward a point of stress force produced by movement of a wheel connected to the suspension.

24. The suspension spring apparatus for a vehicle, as claimed in claim 13, wherein, as the compression spring is linearly aligned between the pivoting lower seat and the pivoting upper seat, the spring is substantially free of transverse deformation, which shortens the life of the spring and creates vibrations that are ineffectively dampened by a shock absorber.

* * * * *